United States Patent
Hsu et al.

(10) Patent No.: US 7,480,904 B2
(45) Date of Patent: Jan. 20, 2009

(54) FIRMWARE UPDATE FOR OPTICAL DISC DRIVE

(75) Inventors: Chi-Chun Hsu, Taipei Hsien (TW); Wen-Yi Wu, Hsin-Chu Hsien (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 246 days.

(21) Appl. No.: 10/907,949

(22) Filed: Apr. 21, 2005

(65) Prior Publication Data
US 2006/0059300 A1    Mar. 16, 2006

(30) Foreign Application Priority Data
Sep. 16, 2004    (TW)    ............... 93128050 A

(51) Int. Cl.
*G06F 9/24* (2006.01)
(52) U.S. Cl. .................. 717/168; 711/112; 710/22
(58) Field of Classification Search ................. 711/113, 711/112; 710/22
See application file for complete search history.

(56) References Cited
U.S. PATENT DOCUMENTS

| | | |
|---|---|---|
| 6,170,043 B1 | 1/2001 | Hu |
| 6,523,083 B1 | 2/2003 | Lin et al. |
| 2004/0062166 A1* | 4/2004 | Tanimukai et al. ........ 369/53.37 |
| 2004/0083469 A1* | 4/2004 | Chen et al. ................... 717/168 |
| 2004/0133711 A1* | 7/2004 | Chen et al. ..................... 710/22 |
| 2004/0143828 A1* | 7/2004 | Liu et al. ..................... 717/168 |
| 2005/0144612 A1* | 6/2005 | Wang et al. .................. 717/168 |

* cited by examiner

*Primary Examiner*—B. James Peikari
(74) *Attorney, Agent, or Firm*—Winston Hsu

(57) ABSTRACT

An optical disc drive includes a firmware memory, a buffer memory, and a system control chip. The system control chip includes a processor and a memory update controller. When the optical disc drive is under a normal mode, the memory update controller is in an idle state. The processor controls the optical disc drive to fetch an update firmware from an optical disc and store the update firmware into the buffer memory. When the optical disc drive is under a firmware update mode, the processor is in an idle state. The memory update controller fetches the update firmware from the buffer memory and stores the update firmware into the firmware memory without the processor executing an update routine code.

18 Claims, 5 Drawing Sheets

FIRMWARE UPDATE FOR OPTICAL DISC DRIVE

BACKGROUND

The present invention relates to an optical disc drive comprising a dedicated memory update controller for updating firmware of the optical disc drive.

An optical disc drive is a device for accessing information stored in optical discs. A processor of an optical disc drive controls operations of the optical disc drive through executing specific program codes. The specific program codes are referred to as the firmware of the optical disc drive. The optical disc drive's firmware includes all needed data, commands, instructions, programs, and all other information utilized by the optical disc drive. The optical disc drive's firmware is always stored in a nonvolatile memory of the optical disc drive and needs to be updated if required.

A firmware update scheme of a system in a related art stores both the needed firmware information and an update routine code in a nonvolatile memory of an optical disc drive. Under a normal operation mode, a processor of the optical disc drive executes the firmware stored in the nonvolatile memory to control operations of the optical disc drive. Under a firmware update mode, the processor executes the update routine code to update the firmware stored in the nonvolatile memory. This firmware update scheme requires additional update routine code. The nonvolatile memory must provide additional space for storing the update routine code. Furthermore, additional time is required for the processor to update the firmware by executing the update routine.

U.S. Pat. No. 6,170,043 discloses another firmware update scheme for optical disc drives. According to this patent, an optical disc drive includes a system control chip, a buffer memory, and a flash memory. The system control chip comprises a microprocessor and an additional memory. Under a normal operation mode, the flash memory stores the optical disc drive's firmware, and the additional memory of the system control chip stores ordinary information. The microprocessor executes the firmware stored in the flash memory to control ordinary operations of the optical disc drive. Under a firmware update mode, the additional memory of the system control chip stores an update routine code. The microprocessor updates the firmware stored in the flash memory by a new version of firmware stored in the buffer memory. The additional update routine code must be provided during firmware update. The firmware update requires significant time.

U.S. Pat. No. 6,523,083 discloses another firmware update method. Unfortunately, this firmware update method needs an additional host device.

SUMMARY

According to the claimed invention, an optical disc drive having at least a normal operation mode and a firmware update mode is disclosed. The optical disc drive includes: a firmware memory; a buffer memory; a processor electrically connected to the firmware memory, for controlling the optical disc drive to fetch an update firmware from an optical disc and store the update firmware into the buffer memory when the optical disc drive is under the normal operation mode; and a memory update controller electrically connected to the firmware memory and the buffer memory, for fetching the update firmware from the buffer memory and storing the update firmware into the firmware memory when the optical disc drive is under the firmware update mode.

According to the claimed invention, a firmware update method utilized in an optical disc drive is disclosed. The optical disc drive includes a firmware memory, a buffer memory, a processor, and a memory update controller. The method includes: (a) controlling the optical disc to fetch an update firmware from an optical disc and store the update firmware into the buffer memory with the processor; and (b) without utilizing the processor to execute an update routine code, utilizing the memory update controller to fetch the update firmware from the buffer memory and store the update firmware into the firmware memory.

DETAILED DESCRIPTION

Figure 1:
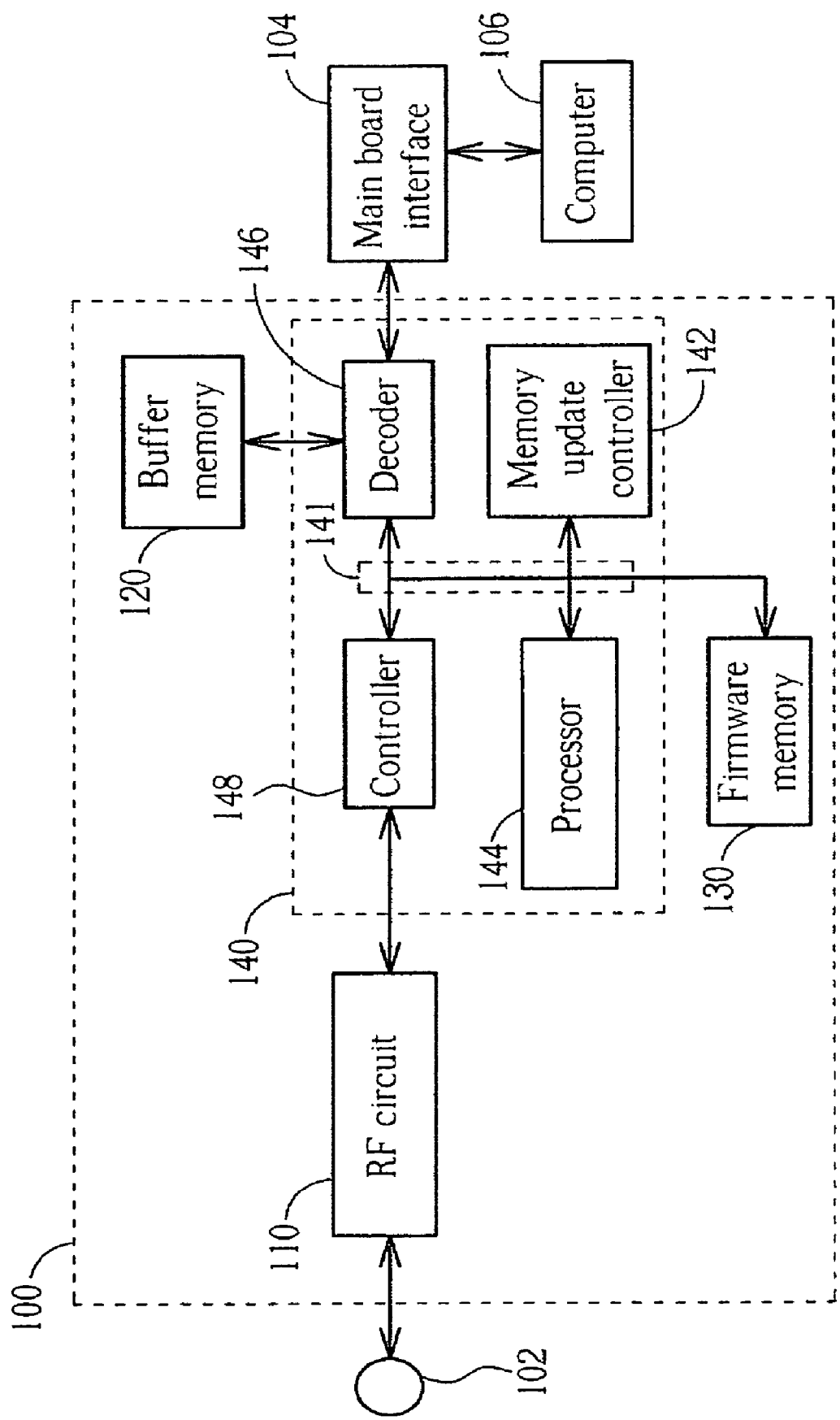
FIG. 1 shows an optical disc drive according to an exemplary embodiment of the present invention.

FIG. 1 shows an optical disc drive 100 according to an exemplary embodiment of the present invention. In this embodiment, the optical disc drive 100 includes a radio frequency (RF) circuit 110, a buffer memory 120, a firmware memory 130, and a system control chip 140. The buffer memory 120 stores information retrieved from an optical disc 102 or information to be recorded into the optical disc 102. The buffer memory 120 can be a volatile memory, such as a dynamic random access memory (DRAM) or a synchronous dynamic random access memory (SDRAM). The firmware memory 130 stores firmware. The firmware memory 130 can be a nonvolatile memory, such as a flash memory, an electrical erasable programmable read only memory (EEPROM), or a serial flash memory.

The system control chip 140 includes a memory update controller 142, a processor 144, a decoder 146, and a controller 148. The processor 144 can be a microprocessor or an embedded processor. A data bus 141 interconnects the memory update controller 142, the processor 144, the decoder 146, and the controller 148. The data bus 141 can also be set external to the system control chip 140. In addition to controlling the RF circuit 110 to access the optical disc 102, the system control chip 140 connects to an optional computer 106 through a main board interface 104. The main board interface 104 can be an integrated drive electronics (IDE) interface, a small computer system interface (SCSI interface), a serial advanced technology attachment (SATA) interface, or any other functionally similar interfaces.

The optical disc drive 100 of this embodiment has a normal operation mode and a firmware update mode. When the optical disc drive 100 is under the normal operation mode, the memory update controller 142 is in an idle state. Through the data bus 141, the processor 144 accesses the firmware stored in the firmware memory 130. The processor 144 controls ordinary operations of the optical disc drive 100 by executing the firmware stored in the firmware memory 130. When a firmware update is required, the processor 144 controls the optical disc drive 100 to fetch an update firmware from the optical disc 102 and store the update firmware into the buffer memory 120 in the same manner as if the update firmware is ordinary information. The update firmware can also be stored in the buffer memory 120 with a specific format, such as a table of content (TOC) format. After the update firmware is retrieved from the optical disc 102 and stored into the buffer memory 120, the optical disc drive 100 enters the firmware update mode. Under the firmware update mode, the processor 144 is in an idle state; the memory update controller 142 becomes a dedicated hardware for updating the firmware. Without utilizing the processor 144 to execute an update routine code, the memory update controller 142 fetches the update firmware from the buffer memory 120 (e.g., through the decoder 146), and updates the firmware memory 130.

For example, every time the computer 106 is turned on or reset, the processor 148 initializes the optical disc drive 100. After the initialization process is finished, the processor 148 enters a standby state to wait for commands from the computer 106. If the system control chip 140 receives a read command, the processor 144 sends corresponding parameters and instructions to control the operations of the decoder 146 and the controller 148. Data is retrieved from the optical disc 102, decoded and corrected if necessary, and stored in the buffer memory 120. The computer 106 then reads the data stored in the buffer memory 120. During the read operation, the optical disc drive 100 is under the normal operation mode, and the memory update controller 142 remains in an idle state.

During the firmware update, the processor 144 first controls the optical disc drive 100 to fetch an update firmware from the optical disc 102 and store the update firmware into the buffer memory 120. Secondly, the processor 144 initializes the memory update controller 142. This initialization process that is performed on the memory update controller 142 can alternatively be performed by the computer 106 or other external devices. The information utilized in the initialization process may include, but is not limited to, a starting address of the update firmware in the buffer memory 120, a size of the update firmware, and a target address of the firmware memory 130. If there does exist a fixed target address, the information utilized in the initialization process may also exclude the fixed target address of the firmware memory 130. After the initialization process is finished, the optical disc drive 100 enters the firmware update mode, the processor 144 enters the idle state, and the memory update controller 142 begins to update the firmware stored in the firmware memory 130.

Figure 2:
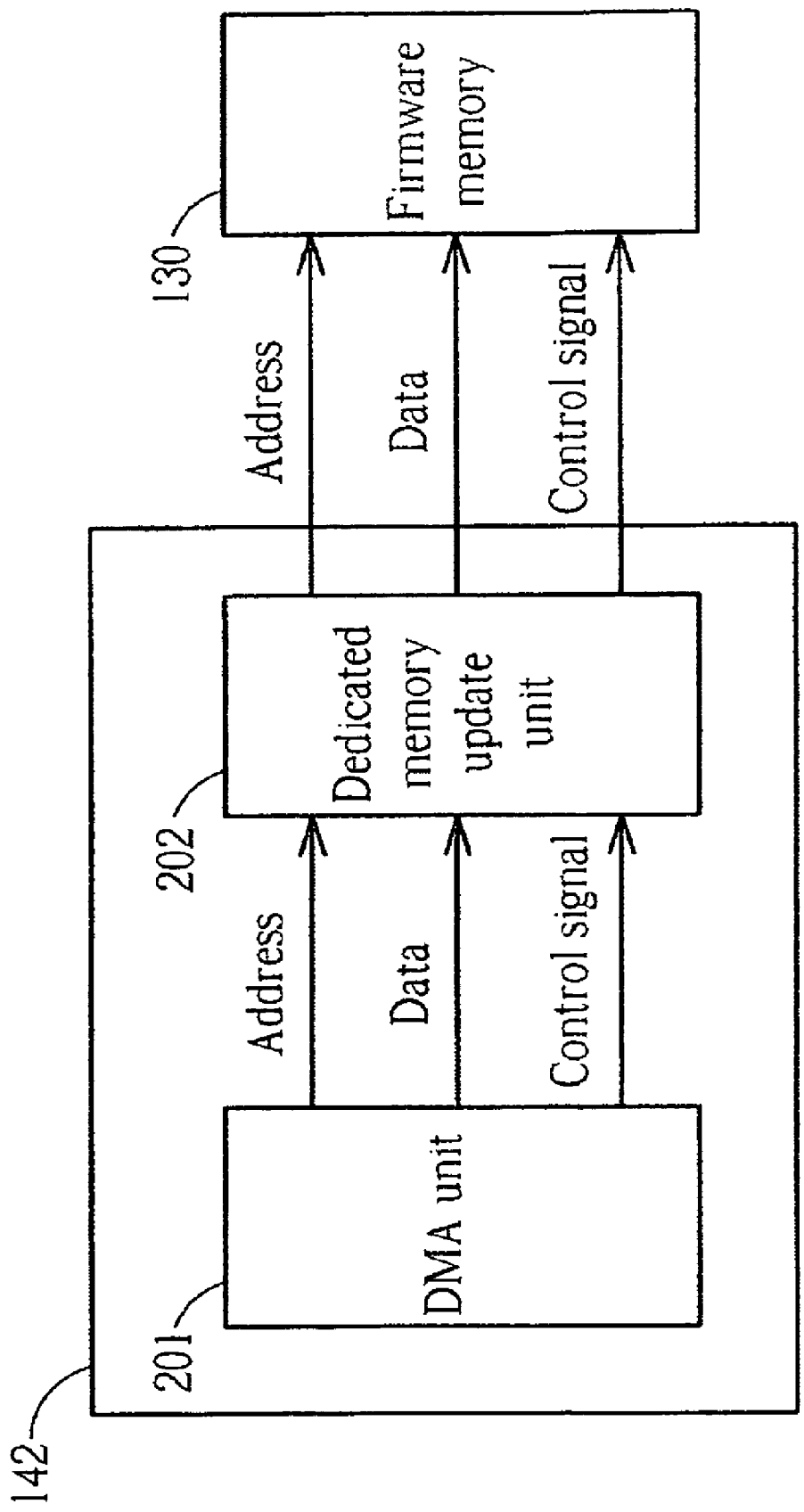
FIG. 2 shows an embodiment of the memory update controller of FIG. 1.

FIG. 2 is a diagram illustrating a relationship between the memory update controller 142 and the firmware memory 130. In FIG. 2, the memory update controller 142 includes a direct memory access (DMA) unit 201 and a dedicated memory update unit 202. The DMA unit 201 fetches the update firmware from the buffer memory 120 (e.g., through the decoder 146) in sequence and sends the fetched update firmware to the dedicated memory update unit 202. The dedicated memory update unit 202 then stores the update firmware received from the DMA unit 201 into the firmware memory 130. Additionally, a small FIFO may be placed between the DMA unit 201 and the dedicated memory update unit 202.

For example, consider that the firmware memory 130 is a flash memory. In this example, there exist multiple methods to update the firmware stored in the firmware memory 130. One is to update the firmware memory 130 in a byte-by-byte manner, and the other is to update the firmware memory 130 in a page-by-page manner. Each page includes 128 bytes of memory space. When the memory update controller 142 is performing the firmware update, the update firmware stored in the buffer memory 120 is treated as ordinary data. When each piece of data is being stored into the firmware memory 130, the firmware memory 130 can send an indication flag to the data bus 141 to report its status. The dedicated memory update unit 202 examines the indication flag to determine whether each piece of data is correctly stored into the firmware memory 130. Once the entire update firmware in the buffer memory 120 is correctly stored into the firmware memory 130, the firmware update is completed. The memory update controller 142 may dispatch a reset signal to reset the processor 144 and switch the optical disc drive 100 back to the normal operation mode.

Figure 3:
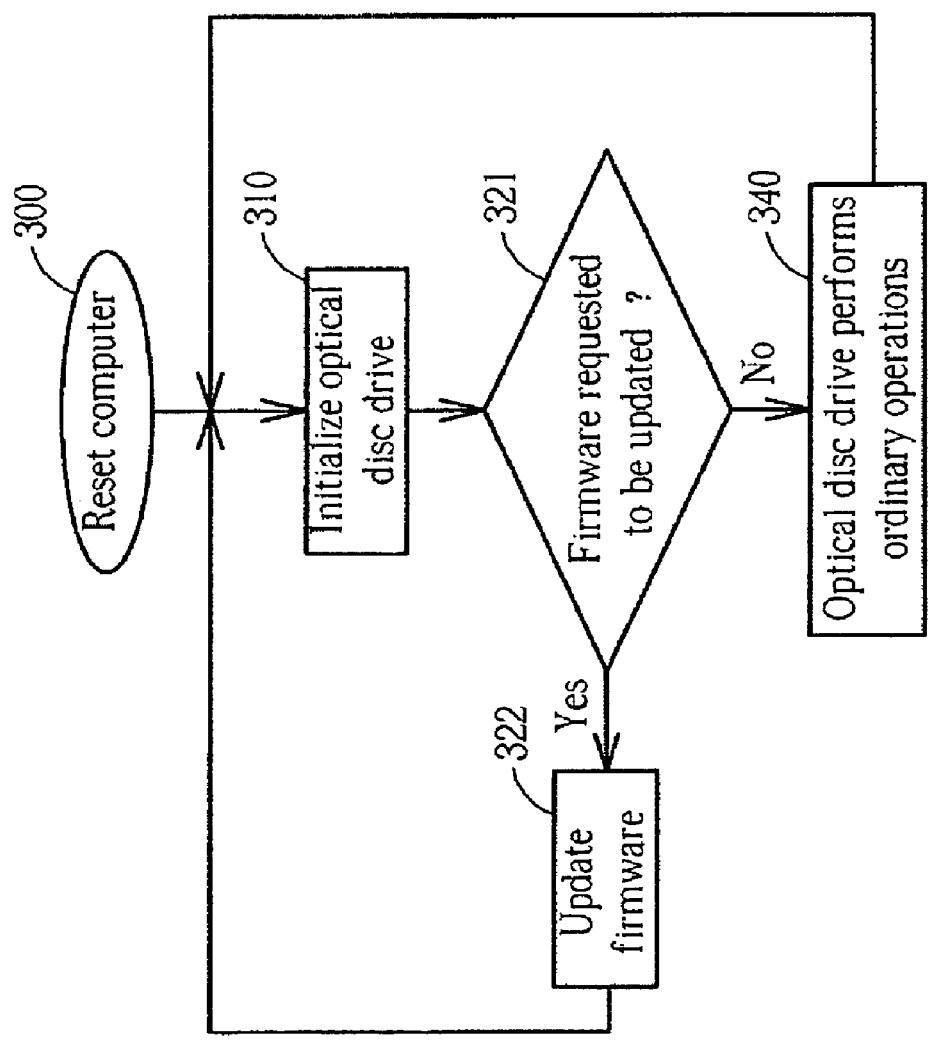
FIG. 3, FIG. 4, and FIG. 5 show flowcharts illustrating how the optical disc drive of FIG. 1 operates.
Figure 4:
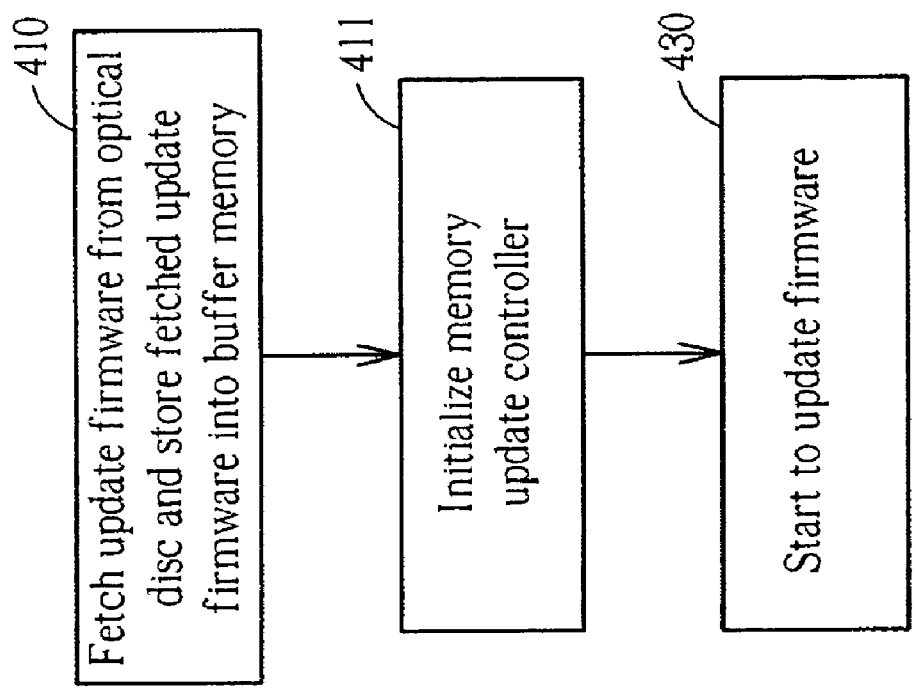
Figure 5:
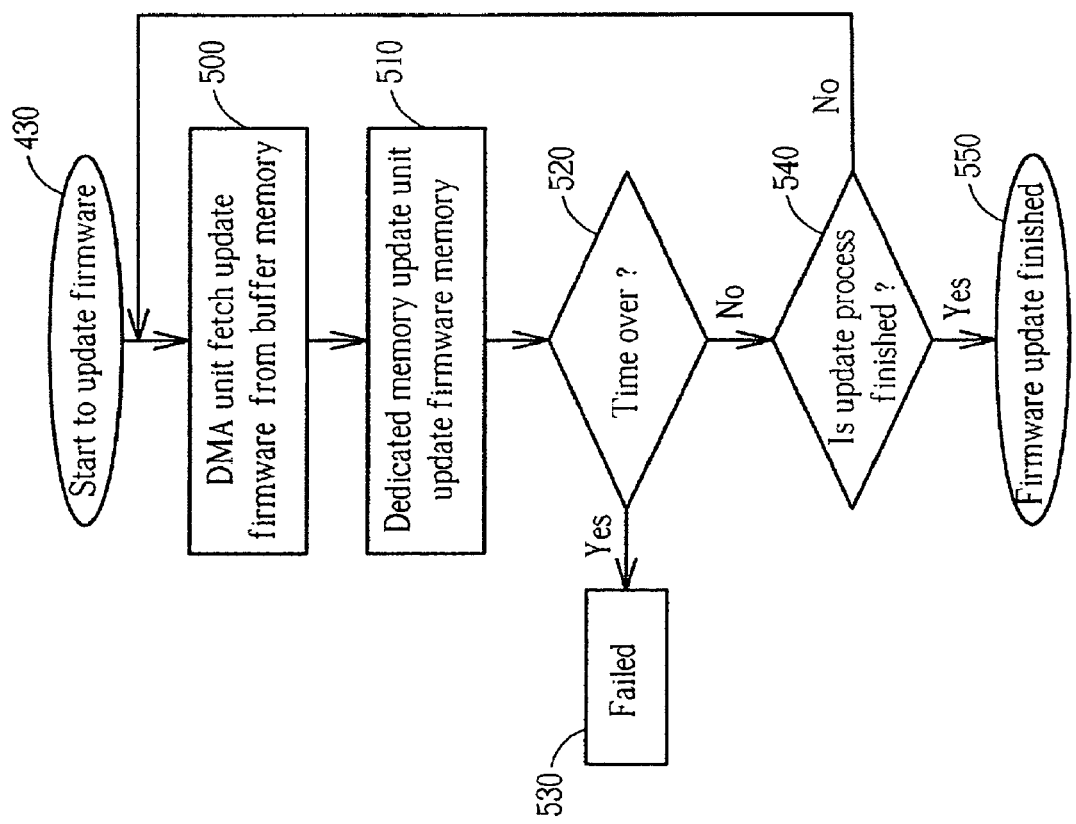

FIGS. 3-5 show flowcharts illustrating the operations of the optical disc drive 100. Please refer to FIG. 3. In step 300, the computer 106 is reset. Next, the computer 106 sends instructions to the processor 144 to make the processor 144 reinitialize the optical disc drive 100 (step 310). After the optical disc drive 100 is reinitialized, the processor 144 continues to determine whether there is a request for firmware update (step 321). The firmware update can be instructed in several ways, for example, by a user through a dedicated user interface or by the computer 106 through the main board interface 104. When there is a request for firmware update, the optical disc drive 100 goes to step 322; otherwise, the optical disc drive 100 goes to step 340 to perform ordinary operations, such as accessing the optical disc 102.

In step 322, the firmware of the optical disc drive 100 is updated. This step can be further divided into two parts, shown in FIGS. 4 and 5, respectively. The first part is under the normal operation mode and the second part is under the firmware update mode.

In step 410 of FIG. 4, the processor 144 executes the firmware stored in the firmware memory 130 to control the optical disc drive 100 to fetch the update firmware from the optical disc 102 and store the update firmware into the buffer memory 120. Next, in step 411, the processor 144 initializes the memory update controller 142. More specifically, the processor 144 sets related information, such as the starting address of the update firmware in the buffer memory 120, the size of the update firmware, and the destination address in the firmware memory 130, into registers of the memory update controller 142. Next, in step 430, the optical disc drive 100 enters the firmware update mode. The memory update controller 142 updates the firmware stored in the firmware memory 130. The processor 144 then enters the idle state.

In step 500, the DMA unit 201 fetches the update firmware from the buffer memory 120 in a byte-by-byte manner or a page-by-page manner. The DMA unit 201 then sends the fetched update firmware and address information to the dedicated memory update unit 202. In step 510, the dedicated memory update unit 202 converts the received update firmware and address information into a format conforming to an update protocol adopted by the firmware memory 130. Finally, the dedicated memory update unit 202 updates the firmware memory 130. Step 520 checks whether the firmware update was completed within a certain time constraint. It is considered that the firmware update is failed if the firmware update is not completed within the time constraint. The optical disc drive 100 goes to step 530 to indicate the failure of the firmware update. The optical disc drive 100 goes to step 540 if the firmware update is finished within the time constraint. Step 530 can be implemented utilizing a counter as an auxiliary tool. Step 540 determines whether the entire update firmware stored in the buffer memory 120 has been written into the firmware memory 130. The firmware update is considered finished if the entire update firmware stored in the buffer memory 120 was written into the firmware memory 130. In this case, step 310 of FIG. 3 is executed next. The optical disc drive 100 enters the normal operation mode, the memory update controller 142 enters the idle state, and the processor 144 reinitializes the optical disc drive 100. Finally, in step 340, the processor 144 controls ordinary operations of the optical disc drive 100 by executing the renewed firmware stored in the firmware memory 130. In the event where step 540 determines that the firmware update is not finished, the memory update controller 142 proceeds with step 500 to process a subsequent byte (or a subsequent page) of the update firmware.

In contrast to the related art, the present invention does not require an additional update routine code or the additional memory space for storing the additional update routine code. In addition, the optical disc drive of the present invention does not rely on an external host device to provide an update firmware. The update firmware is fetched directly from an optical disc. Firmware may be updated regardless of the optical disc drive being connected or not connected to an external host device. Furthermore, since the memory update controller is utilized to update firmware of the optical disc drive without utilizing the processor to execute an update routine code, the firmware update is faster than that of the related art.

What is claimed is:

1. An optical disc drive having a normal operation mode and a firmware update mode, the optical disc drive comprising:
   a firmware memory;
   a buffer memory;
   a processor electrically connected to the firmware memory, for controlling the optical disc drive to fetch an update firmware from an optical disc and store the update firmware into the buffer memory when the optical disc drive is under the normal operation mode; and
   a memory update controller electrically connected to the firmware memory and the buffer memory, for fetching the update firmware from the buffer memory and storing the update firmware into the firmware memory when the optical disc drive is under the firmware update mode without the processor executing an update routine code for updating firmware stored in the firmware memory.

2. The optical disc drive of claim 1, wherein the memory update controller comprises:
   a direct memory access (DMA) unit electrically connected to the buffer memory, for fetching the update firmware from the buffer memory; and
   a dedicated memory update unit electrically connected to the DMA unit and the firmware memory, for receiving the update firmware from the DMA unit and storing the update firmware into the firmware memory.

3. The optical disc drive of claim 1, wherein when the optical disc drive is under the normal operation mode, the processor executes the firmware stored in the firmware memory to control operations of the optical disc drive.

4. The optical disc drive of claim 1, wherein when the optical disc drive is under the firmware update mode, the processor is in an idle state; when the optical disc drive is under the normal operation mode, the memory update controller is in an idle state.

5. The optical disc drive of claim 1, wherein the processor and the memory update controller are set in a system control chip of the optical disc drive.

6. The optical disc drive of claim 1, wherein the firmware memory is a flash memory, an electrical erasable programmable read only memory (EEPROM), or a serial flash memory.

7. The optical disc drive of claim 1, wherein the buffer memory is a dynamic random access memory (DRAM) or a synchronous dynamic random access memory (SDRAM).

8. A system control chip utilized in an optical disc drive, for updating firmware of the optical disc drive, the system control chip comprising:
   a processor electrically connected to a firmware memory of the optical disc drive, the firmware memory being for storing firmware of the optical disc drive;
   a controller electrically connected to the processor, for receiving a control signal and general data;
   a decoder electrically connected to the processor, the controller, and a buffer memory of the optical disc drive;
   a memory update controller electrically connected to the processor, the decoder, and the firmware memory, for receiving an update firmware from the decoder and storing the update firmware into the firmware memory without the processor executing an update routine code for updating firmware stored in the firmware memory.

9. The system control chip of claim 8, wherein the processor, the controller, the decoder, and the memory update controller are interconnected through a data bus.

10. The system control chip of claim 9, wherein the processor sets the memory update controller through the data bus.

11. The system control chip of claim 8, wherein the memory update controller comprises:
   a direct memory access (DMA) unit electrically connected to the decoder, for receiving the update firmware from the decoder; and
   a dedicated memory update unit electrically connected to the DMA unit and the firmware memory, for receiving the update firmware from the DMA unit and storing the update firmware into the firmware memory.

12. The system control chip of claim 8, wherein the processor executes the firmware stored in the firmware memory to control operations of the decoder and the controller.

13. The system control chip of claim 8, wherein the firmware memory is a flash memory, an electrical erasable programmable read only memory (EEPROM), or a serial flash memory.

14. The system control chip of claim 8, wherein the buffer memory is a dynamic random access memory (DRAM) or a synchronous dynamic random access memory (SDRAM).

15. A firmware update method utilized in an optical disc drive, the optical disc drive comprising a firmware memory, a buffer memory, a processor, and a memory update controller, the method comprising:
   (a) controlling the optical disc to fetch an update firmware from an optical disc and store the update firmware into the buffer memory with the processor; and
   (b) without utilizing the processor to execute an update routine code for updating firmware stored in the firmware memory, utilizing the memory update controller to fetch the update firmware from the buffer memory and store the update firmware into the firmware memory.

16. The method of claim 15, wherein:
   step (a) further comprises controlling the memory update controller to be in an idle state; and
   step (b) further comprises controlling the processor to be in an idle state.

17. The method of claim 15, wherein the firmware memory is a flash memory, an electrical erasable programmable read only memory (EEPROM), or a serial flash memory.

18. The method of claim 15, wherein the buffer memory is a dynamic random access memory (DRAM) or a synchronous dynamic random access memory (SDRAM).

* * * * *